UNITED STATES PATENT OFFICE.

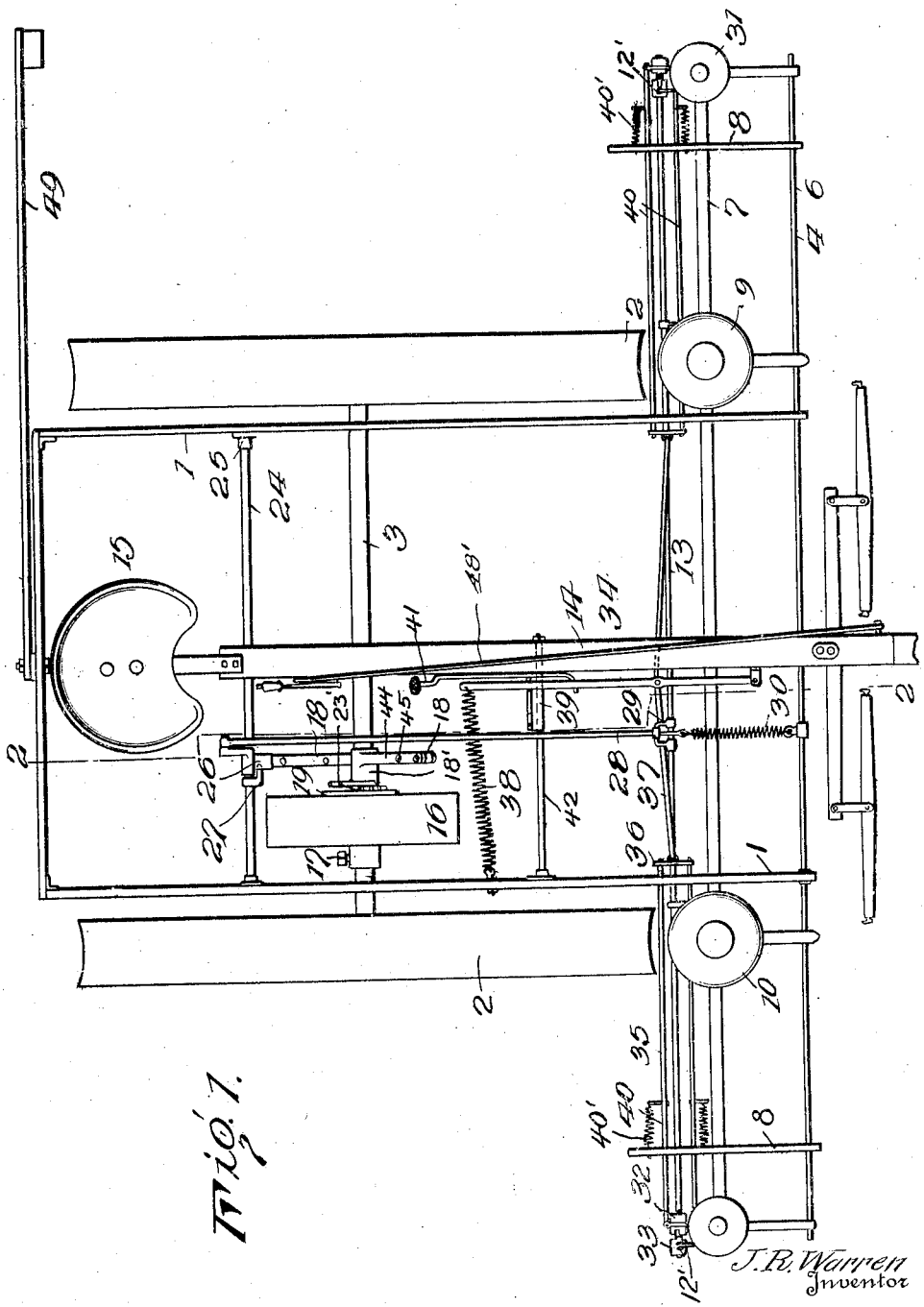

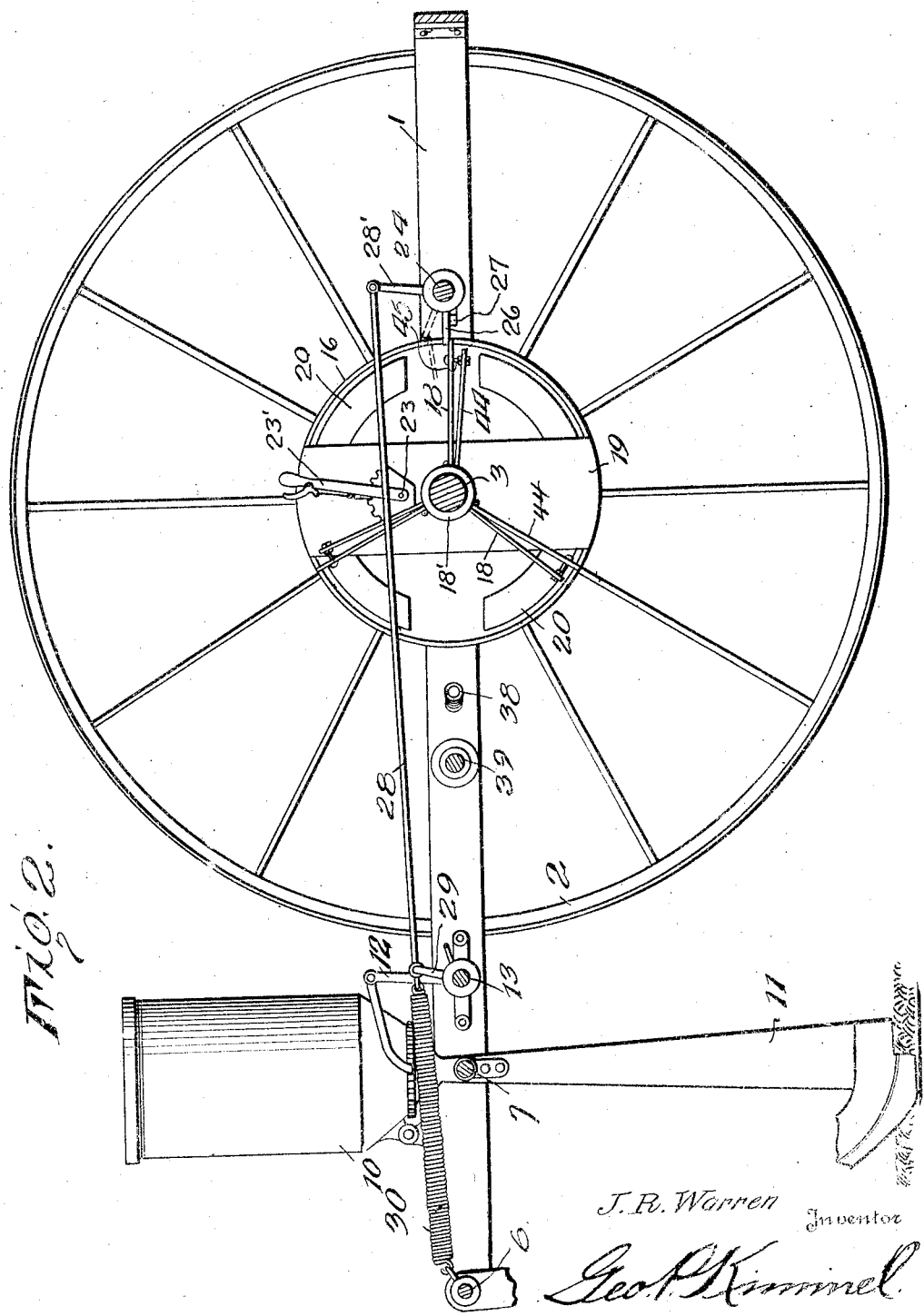

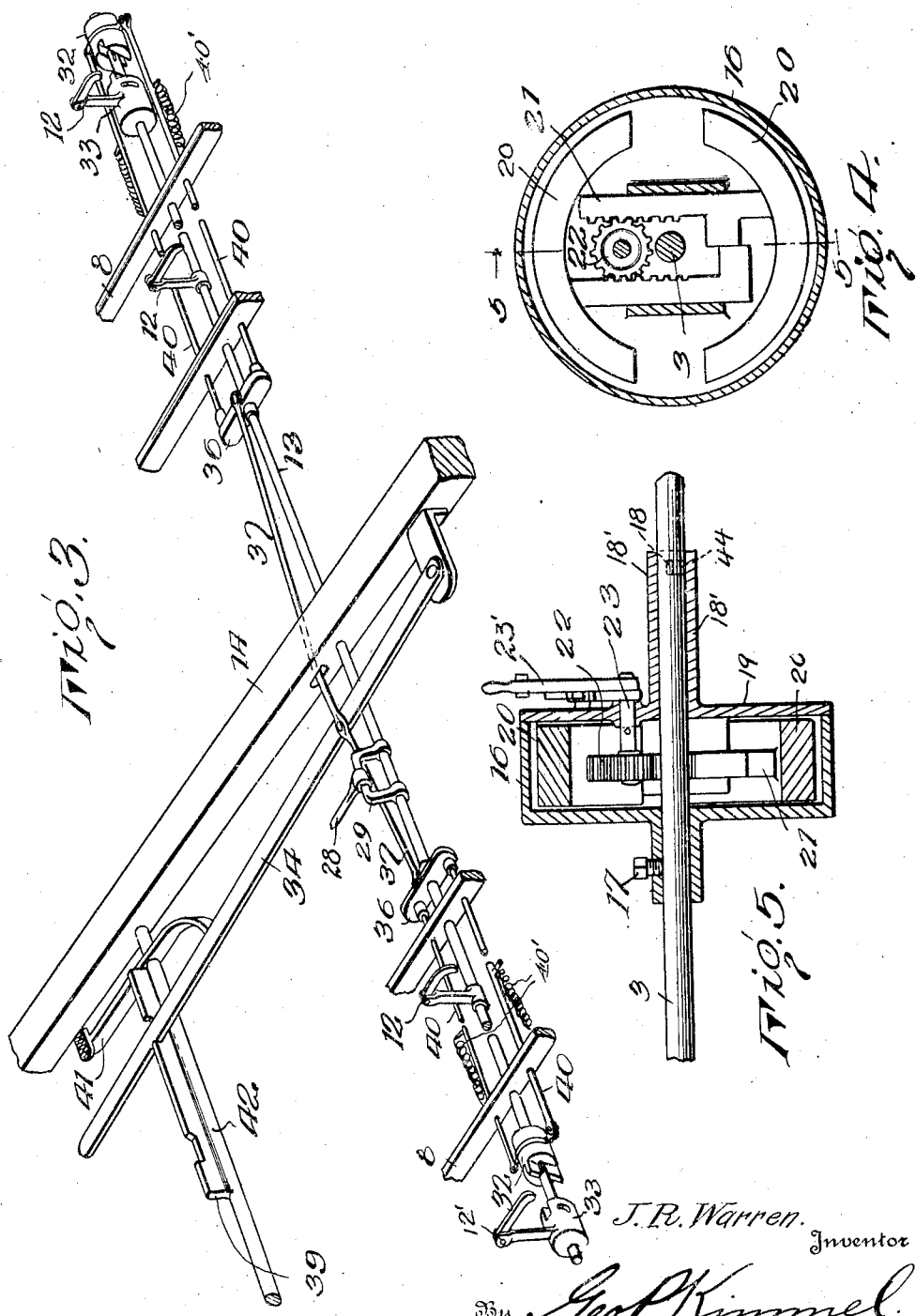

JOHN R. WARREN, OF MARSHALLTOWN, IOWA.

MECHANICAL MOVEMENT.

1,350,250.   Specification of Letters Patent.   Patented Aug. 17, 1920.

Application filed February 13, 1917. Serial No. 148,316.

*To all whom it may concern:*

Be it known that I, JOHN R. WARREN, a citizen of the United States, and resident of Marshalltown, in the county of Marshall and State of Iowa, have invented certain new and useful Improvements in Mechanical Movements, of which the following is a specification.

This invention relates to new and useful improvements in mechanical movements designed for use more particularly in connection with corn planters and like devices, adapted to be automatically operated for sowing seed in check rows without the aid of the well-known check line.

Another object of the invention is to provide a device of this character provided with means adapted to render the dispensing mechanism operative or inoperative, as desired.

Another object of the invention is to provide a corn planter with markers adapted to be automatically moved into operative position when desired to insure proper transverse alinement of the rows planted.

A further object of the invention is to provide a corn planter of this character which is provided with seed dispensing mechanism including planting boots, the frame of said planter being adapted to swing upwardly adjacent its front end when the machine is to be turned to withdraw the boots from the ground.

Another object of the invention is to provide a device of this character provided with dispensing mechanism operable at predetermined intervals by a plurality of radially projecting fingers positioned on a rotatable shaft, the said fingers being provided with means for gaging their position adjacent the arm that operates the dispensing mechanism to correctly operate the said mechanism when the operation of the machine to which the device is applied is resumed after turning at the end of its trip.

Another object of the invention is to provide a device of this character which is easily and simply constructed, inexpensive to manufacture, and efficient in operation.

With these and numerous other objects in view my invention consists in the novel features of construction, combination and arrangement of parts which will be herein referred to and more particularly pointed out in the specification and claims.

In the accompanying drawings:

Figure 1 is a plan view of a corn planter with the improvement applied;

Fig. 2 is a longitudinal section on the line 2—2 of Fig. 1;

Fig. 3 is a detailed perspective view of the operating means employed when the device is adapted to be seed dispensing, and marker operating apparatus of a corn planter;

Fig. 4 is a vertical section through the clutch that controls the operation of the dispensing mechanism, and Fig. 5 is a section on the line 5—5 of Fig. 4.

In describing my invention I shall refer to the drawings in which similar reference characters designate corresponding parts throughout the several views. For the purpose of illustration the improved device is shown applied to a corn planter to which it is more particularly applicable. The numeral 1 designates the main supporting frame of the planter, which is held in position by a pair of traction wheels 2 which are mounted on a transversely extending axle 3, which is rotatably positioned through the frame 1. The main frame 1 is provided with a transversely extending supplemental frame 4 at the front of the same, that extends beyond the opposite sides of the main frame in front of the wheels 2. This supplemental frame is formed by a pair of parallel transversely extending rods 6 and 7 which are connected adjacent their outer ends by strips 8 which extend parallel with the sides of the main frame.

The corn planter is provided with the conventional type of seed dropping mechanism 9 which includes seed holding hoppers 10, and planting boots 11 positioned beneath the same and which are operated by pawls 12. The pawls 12 that operate the seed dispensing mechanism are mounted on a rock shaft 13 that extends in parallel relation to the rods 6 and 7 of the supplemental frame. This shaft 13 is adapted to rock to move the pawls 12 to operate the seed dispensing mechanism at predetermined intervals as will be hereinafter more fully described.

The frame 1 is provided with a longitudinally extending centrally disposed main beam 14 that extends from the front of the supplemental frame, and which has positioned on its rear end the conventional type of seat 15 which is commonly used in devices of this character. The rotatable axle 3 extends through the beam 14, and mounted on the said axle adjacent one side of the frame 1 is a drum 16, which is secured to rotate with the axle by a set screw in its hub, as shown at 17. Loosely mounted on the rotatable axle 3 is a hub 18' having a plurality of radially projecting fingers 44, the hub portion extending laterally and having a plate 19 on one end and next to the drum 16.

Hingedly united to the hub 18' next each of the fingers 44 is another or supplemental finger 18, each finger 18 being longer than the adjacent finger 44 and extending beyond the same, as shown in Fig. 2. Each pair of the fingers 44 and 18 are coupled near their outer ends by adjusting bolts 45, operating to increase or decrease the distance between the free ends of the fingers, the object to be hereafter explained. The fingers 44 are positioned adjacent the open side of the drum 16, and positioned within said drum is a clutch mechanism which comprises a pair of movable shoes 20 that are located on opposite sides of the axle 3. Each of the shoes 20 is provided with an inwardly projecting guide member 21 which guide members are disposed in spaced relation on opposite sides of said axle, and these guides are slidably positioned within the drum 16, and are adapted to move toward and away from each other for engagement and disengagement with the inner wall of the drum. The inner faces of the members 21 have a plurality of teeth thereon, and positioned between said members and operatively engaging the teeth is a gear 22 which is mounted on a short shaft 23 extending through the plate 19. The outer end of the short shaft 23 is provided with an operating lever 23', which is adapted to cause the gear 22 to move the clutch in and out of engagement whereupon it is obvious that the fingers loosely mounted relatively to the axle 3 are adapted to be moved in or out of engagement with the same.

Extending transversely of the frame 1 and parallel with the axle 3, between the same and the rear end of the frame is a non-rotatable shaft 24, which has its opposite ends mounted in sockets 25 on the inner sides of the frame 1. This shaft 24 has pivotally mounted thereon a hub 26' having a forwardly projecting arm 26 which is adapted to normally project into the paths of the fingers 18, so that it will be engaged by the same when the fingers are rotated. Attached to the stationary member 24 is a stop finger 27 extending into the path of the member 26 to limit the movement of the same in one direction and with means to return it to normal position after it is disengaged from the fingers 18. Extending longitudinally of the main frame 1 is a rod 28 which has one end connected with an arm 26, and the other end connected to a bracket 29 positioned on the rock shaft 13 that operates the seed dispensing mechanism. The forward end of the rod 28 extends beyond the bracket 29, and positioned between the same and the forward end of the frame is a coil spring 30, which is adapted to exert a constant tension on the rod, so as to return the arm 26 to normal position in contact with the stop 27. By the arrangement of these parts it is obvious that upon one of the fingers 18 engaging the arm 26, the same will be lifted, and consequently owing to the fact that the same is connected to the rod 28 by the arm 28', the said rod will be moved rearwardly against the tension of the spring 30. This will rock the shaft 13 and operate the seed dispensing mechanism. Owing to the fact that the rod 28 is spring tensioned it is obvious that upon the arm 26 being released by the finger, the spring will return the rod to normal position for movement by the next finger.

Secured above the opposite ends of the supplemental frame 4 are hoppers 31 for holding marking powder, which are adapted to be operated by pawls 12', which in turn are operated by the rock shaft 13 when the same is operatively connected therewith. The opposite ends of the rock shaft that are disposed adjacent the marking powder dispensing hoppers are provided with clutch members 32 and 33, the member 33 being normally loosely mounted to the shaft 13, while the other member 32 is slidably but non-rotatably mounted thereon. The operating pawls 12' are mounted on the member 33, and when the members 32 and 33 are moved into operative engagement the shaft will be oscillated to cause the operation of the marker powder dropping mechanism.

The marker mechanisms are adapted to be moved into operative position by means of an operating lever 34, which is positioned longitudinally on the main frame 1 adjacent the beam 14. Each of the movable members 32 of the clutches that are disposed adjacent the ends of the shaft 13 is provided with an annular groove in which is positioned a ring, having laterally projecting ears, in which are fastened connecting rods 40, disposed on opposite sides of the shaft 13, and which have their rear ends connected by a laterally projecting plate 36, which is slidably mounted on the shaft 13 adjacent the operating lever 34. These plates 36 are connected with the lever 34 by links 37, and upon movement of the lever the movable members of the clutches will be simultaneously actuated. The operating lever 34 has its upper end connected with one side of the frame 1 by a coil spring 38, which is adapted to exert a constant lateral tension on said lever, so as to automatically operate the same as will be hereinafter described. The lever 34 is slidably positioned on a rack 39 which is provided with a pair of notches therein, into which said lever is adapted to be positioned. When the lever is positioned in the notch adjacent the beam 14 the clutches will be thrown out of engagement with the rock shaft 13, but upon lifting the lever 34, the spring 38 will automatically draw the same laterally toward one side of the frame, and hence it will move over into position within the outer notch whereupon the clutches will operate and the rock shaft 13 will be engaged with the pawl that operates the marker powder dispensing mechanism, whereupon upon movement of the seed dispensing mechanism the marker dispensing mechanism will be operated simultaneously therewith. The connecting rods 40 are spring tensioned as shown at 40′ so as to enable the operating lever to easily move the clutches out of operative relation.

The operating lever 34 is adapted to be moved out of the first notch by means of a foot pedal 41, which is pivotally mounted on a transversely extending rod 42 between the beam 14 and the adjacent side of the frame, the said pedal having its outer end curved laterally and positioned beneath the lever 34, so that upon downward movement of the tread portion of the pedal, this end will be raised to lift the lever so that the spring 38 will automatically draw the same over to the second notch. This foot pedal forms an automatic means for manually controlling the clutches that control the operation of the marker powder dispensing mechanism.

Each of the radially projecting fingers 44 is loosely mounted relatively to the axle 3, and controls the operation of the seed dispensing mechanism at predetermined intervals. Each finger 44 is provided with a supplemental finger 18 which is hingedly connected therewith and is movable toward and from the same by means of lock nuts 45. These supplemental fingers 18 act as gages whereby the fingers 44 can be minutely adjusted for causing contact with the arm at the desired intervals. This permits a correct adjustment of the timing of the seed dropping mechanism, when the operation of the planter is resumed after the same is turned at the end of a row.

When it is desired to operate the planter, the clutch mechanism within the casing 16 is moved in operative position by actuating the lever 23′, whereupon the fingers 18—14 are operatively connected with the rotatable shaft or axle 3 that extends through the main frame. Upon forward movement of the planter the fingers 18—14 will be rotated, and engage the arm 26 that is connected with the trip mechanism that rocks the shaft 13 that is operatively connected with the seed dispensing mechanism carried by the front end of the machine. These arms will operate the trip mechanism at predetermined intervals, so that the seeds will be at corresponding intervals dropped. These arms 18 are so spaced as to properly time the operation of the seed dispensing mechanism as desired. The marker powder hoppers that are carried on the adjacent ends of the supplemental front frame, are adapted to be operatively connected with the rock shaft 13, and upon movement of the foot pedal that releases the operating lever 34 that operates the clutches that connect these powder carriers with the rock shaft, the same will be thrown into engagement with the seed dispensing mechanism whereupon when the seed dispensing mechanism is operated, the powder carriers will be operated simultaneously therewith. These powder carriers are only thrown in operation when the planter approaches one end of a row, so as to clearly mark the position in which the seeds were planted so as to renew the planting operation, to plant the seeds in proper transverse alinement. It is obvious that only one marker may be operated at once by only filling one hopper, but the planter is provided with markers on both sides of the same so as to be applicable to be turned either to the right or left. These marker hoppers are provided with any desired type of marking powder, such as rice, lime, etc.

When the operator throws his weight rearwardly, this will cause the frame to tilt, and hence the forward end of the beam will buckle, and the seed planting boots at the front of the frame will be lifted from the ground so as to enable the planter to be easily and quickly turned. To correctly gage the time for the fingers that operate the trip mechanism so as to dispense the seeds in vertical alinement with the seeds of the adjacent row which have just been planted, the supplemental fingers 18 are operated as follows: When the planter is turned and affixed approximately in the correct position, the fingers are rotated once by hand to drop the desired amount of seed, and immediately after the finger that lifts the arm 26 has passed the same, when the arm returns to normal position, the supplemental finger that is hingedly secured to the first-mentioned finger is so arranged that it will be disposed in horizontal alinement with the arm. When in this position the clutch may be thrown in to operatively connect the trip fingers 18 with the rotatable axle, and the planter may be started whereupon the operation of the fingers is correctly timed to drop the seeds in transverse alinement with the adjacent row. If desired the rear end of the frame may be provided with the conventional type of marker arm 49, such as is commonly used on devices of this character. Any number of seed dispensing hoppers may be operated on the rock shaft 13, but preferably a pair are used, each hopper being disposed in alinement with the traction wheel that is disposed directly behind the same.

From the foregoing description and the construction and arrangement of my new and improved type of planter, the manner of applying the same to use and the operation thereof will be readily understood, and it will be seen that I have provided a simple and efficient means for carrying out the objects of this invention.

Having thus fully described my invention, what I claim as new and desire to secure by Letters Patent is:—

1. In an apparatus of the class described, a rotating member, a plurality of radially disposed fingers carried by said rotating member, a supplemental finger associated with each of the radial fingers and swinging relative thereto, means for adjusting the supplemental fingers at their free ends toward and away from the radial fingers, a support adjacent the rotating member, a transmitting arm carried by the supporting member, and a trip carried by the supporting member and extending into the paths of the supplemental fingers.

2. In an apparatus of the class described, a rotating member, a finger extending radially of said rotating member, a supplemental finger movable relative to said radial finger, means for adjusting the supplemental finger toward and away from the radial finger, a transmitting means, and a trip device associated with the transmitting means and extending into the path of the supplemental finger.

3. In an apparatus of the class described, a rotating member, a clutch shell carried by said rotating member, contact shoes within said shell, a holding member having a hub rotative on said rotating member, means carried by said supporting member for contacting said shoes with said shell, a plurality of radially disposed fingers carried by said hub, a supplemental finger associated with each of the radial fingers, means for adjusting the supplemental fingers relatively to the radial fingers, a support adjacent the rotating member, a transmitting arm carried by the rotating member, and a trip carried by the supporting member and extending into the paths of the supplemental fingers.

In testimony whereof I affix my signature hereto.

JOHN R. WARREN.